US012755272B2

(12) United States Patent
Zhao et al.

(10) Patent No.: US 12,755,272 B2
(45) Date of Patent: Oct. 6, 2026

(54) PAYMENT TOKENIZATION METHOD, APPARATUS AND SYSTEM BASED ON DIGITAL CURRENCY SUB-WALLET

(71) Applicant: DIGITAL CURRENCY INSTITUTE, THE PEOPLE'S BANK OF CHINA, Beijing (CN)

(72) Inventors: Tianwu Zhao, Beijing (CN); Zhihua Jiang, Beijing (CN); Kefeng Xu, Beijing (CN)

(73) Assignee: DIGITAL CURRENCY INSTITUTE, THE PEOPLE'S BANK OF CHINA, Beijing (CN)

( * ) Notice: Subject to any disclaimer, the term of this patent is extended or adjusted under 35 U.S.C. 154(b) by 226 days.

(21) Appl. No.: 18/700,186

(22) PCT Filed: Oct. 9, 2022

(86) PCT No.: PCT/CN2022/124050
§ 371 (c)(1),
(2) Date: Apr. 10, 2024

(87) PCT Pub. No.: WO2023/061285
PCT Pub. Date: Apr. 20, 2023

(65) Prior Publication Data
US 2024/0403859 A1 Dec. 5, 2024

(30) Foreign Application Priority Data
Oct. 11, 2021 (CN) ......................... 202111183451.X

(51) Int. Cl.
*G06Q 20/36* (2012.01)
*G06Q 20/40* (2012.01)

(52) U.S. Cl.
CPC ............. *G06Q 20/36* (2013.01); *G06Q 20/40* (2013.01)

(58) Field of Classification Search
CPC ............................... G06Q 20/36; G06Q 20/40
See application file for complete search history.

(56) References Cited

U.S. PATENT DOCUMENTS 10,929,841 B1 * 2/2021 Kalaboukis .......... G06Q 20/363
2014/0129435 A1 5/2014 Pardo et al.
(Continued)

FOREIGN PATENT DOCUMENTS

CA 2845580 A1 * 9/2014
CN 105512876 A 4/2016
(Continued)

OTHER PUBLICATIONS

Goher; An extension for the mobile payment collaborative model proposed for developing countries; Communication, Management and Information Technology, 2017, p. 263-270.*
(Continued)

*Primary Examiner* — Ilse I Immanuel
(74) *Attorney, Agent, or Firm* — The Sun IP Law

(57) ABSTRACT

Provided are a payment tokenization method, apparatus and system based on a digital currency sub-wallet. One specific embodiment of the method includes: parsing a payment token acquisition request of a user, so as to obtain a target digital wallet, a target merchant, and a wallet payment password corresponding to the target digital wallet; sending the wallet payment password to an operating system of the target digital wallet, so that the operating system of the target digital wallet verifies the wallet payment password; in the case that the verification is passed, sending a sub-wallet opening request to the operating system of the target digital wallet; and in the case that wallet opening is successful, sending a payment token generation request to a token
(Continued)

service provider, so that the token service provider generates a payment token corresponding to a digital currency sub-wallet.

18 Claims, 6 Drawing Sheets

(56) References Cited

U.S. PATENT DOCUMENTS

| | | | | |
|---|---|---|---|---|
| 2016/0086166 | A1* | 3/2016 | Pomeroy | G06Q 20/3674<br>705/40 |
| 2017/0032362 | A1 | 2/2017 | Lahkar | |
| 2018/0039977 | A1 | 2/2018 | Hwee | |
| 2018/0330364 | A1 | 11/2018 | Driscoll | |

FOREIGN PATENT DOCUMENTS

| | | | |
|---|---|---|---|
| CN | 109034818 | A | 12/2018 |
| CN | 110400139 | A | 11/2019 |
| CN | 110443607 | A | 11/2019 |
| CN | 110910134 | A | 3/2020 |

OTHER PUBLICATIONS

The extended search report of counterpart EP application No. 22880224.5 issued on Oct. 22, 2024.

The first office action of counterpart CN application No. 202111183451X issued on Jul. 30, 2025.

* cited by examiner

PAYMENT TOKENIZATION METHOD, APPARATUS AND SYSTEM BASED ON DIGITAL CURRENCY SUB-WALLET

CROSS-REFERENCE TO RELATED APPLICATION

The present disclosure claims the priority of Chinese Patent application No. 202111183451.X, filed on Oct. 11, 2021 and entitled "Payment Tokenization Method, Apparatus and System Based on Digital Currency Sub-Wallet", and the entire content disclosed in the Chinese patent application mentioned above is hereby cited as part or all of the present disclosure.

TECHNICAL FIELD

The present disclosure relates to the technical field of computers, and in particular to a payment tokenization method, apparatus and system based on a digital currency sub-wallet.

BACKGROUND

In electronic payment consumption, payment tokenization is to use a unique payment token (associated with a payment account number) for transaction verification, and meanwhile, the payment token is defined to be used in a particular merchant and channel. In the existing payment scenario, upon generating a consumption willingness or a consumption demand, a user initiates a flow of applying for a payment token at a merchant end. The user cannot actively establish, adjust or cancel a payment token relationship at a wallet party from the perspective of asset management.

SUMMARY

In view of this, embodiments of the present disclosure provide a payment tokenization method, apparatus and system based on a digital currency sub-wallet.

In order to achieve the above purpose, according to one aspect of the embodiments of the present disclosure, provided is a payment tokenization method based on a digital currency sub-wallet, including:

parsing a payment token acquisition request of a user, so as to obtain a target digital wallet, a target merchant, and a wallet payment password corresponding to the target digital wallet;

sending the wallet payment password to an operating system of the target digital wallet, so that the operating system of the target digital wallet verifies the wallet payment password, and receiving a verification result returned by the operating system of the target digital wallet;

in the case that the verification result is passed, sending a sub-wallet opening request to the operating system of the target digital wallet, so that the operating system of the target digital wallet generates a digital currency sub-wallet corresponding to the target digital wallet and the target merchant, and receiving a sub-wallet opening result returned by the operating system of the target digital wallet; and in the case that wallet opening is successful, sending a payment token generation request to a token service provider, so that the token service provider generates a payment token corresponding to the digital currency sub-wallet, and receiving a payment token generation result returned by the token service provider.

According to one or more embodiments of the present disclosure, the payment tokenization method of the embodiments of the present disclosure further includes:

before receiving the payment token acquisition request of the user, acquiring a merchant list of the user from the token service provider, and sending the merchant list to a terminal for display, so that the user selects one or more merchants from the merchant list as the target merchant; or, before receiving the payment token acquisition request of the user, acquiring a digital wallet list of the user, and sending the digital wallet list to the terminal for display, so that the user selects the target digital wallet from the digital wallet list.

According to one or more embodiments of the present disclosure, the payment tokenization method of the embodiments of the present disclosure further includes:

after acquiring the digital wallet list of the user and sending the digital wallet list to the terminal for display, in response to an operation of the user for selecting the target digital wallet from the digital wallet list, acquiring a merchant list corresponding to the target digital wallet, and sending the merchant list to the terminal for display, so that the user selects one or more merchants from the merchant list corresponding to the target digital wallet as the target merchant.

According to one or more embodiments of the present disclosure, the payment tokenization method of the embodiments of the present disclosure further includes: after the user selects one or more merchants from the merchant list as the target merchant, acquiring account information of the target merchant, verifying the account information of the target merchant, and confirming that the verification is passed.

According to one or more embodiments of the present disclosure, acquiring the account information of the target merchant includes:

judging whether there is the account information of the target merchant in a local storage device; if so, acquiring the account information of the target merchant from the local storage device; and otherwise, acquiring the account information of the target merchant from a merchant mechanism system of the target merchant, and storing the acquired account information of the target merchant in the local storage device.

According to one or more embodiments of the present disclosure, verifying the account information of the target merchant includes: verifying whether real name information of the target merchant is consistent with communication information of the target merchant; if so, the verification is passed; and otherwise, the verification is not passed.

According to one or more embodiments of the present disclosure, after generating the payment token corresponding to the digital currency sub-wallet, the token service provider pushes the payment token to the operating system of the target digital wallet; the operating system of the target digital wallet pushes the payment token to the merchant mechanism system of the target merchant; the merchant mechanism system of the target merchant pushes the payment token to a merchant server system of the target merchant;

after receiving the payment token, the merchant server system of the target merchant returns a response message to the merchant mechanism system of the target merchant; after receiving the response message returned by the merchant server system of the target merchant, the merchant mechanism system of the target merchant returns the response message to the operating system of the target digital wallet; after receiving the response message returned by the merchant mechanism system of the target merchant, the operating system of the target digital wallet returns the response message to the token service provider; after receiving the response message returned by the operating system of the target digital wallet, the token service provider generates the payment token generation result; and wherein the merchant server system of the target merchant pushes the payment token to a merchant terminal of the target merchant, so that the merchant terminal of the target merchant displays the message pushed by the merchant server system of the target merchant.

According to one or more embodiments of the present disclosure, the payment tokenization method of the embodiments of the present disclosure further includes: before sending the sub-wallet opening request to the operating system of the target digital wallet, confirming that there is no digital currency sub-wallet corresponding to the target digital wallet and the target merchant.

According to one or more embodiments of the present disclosure, the payment token acquisition request includes: a plurality of consumption accounts of the user in the target merchant; and sending the payment token generation request to the token service provider includes: respectively sending, to the token service provider, the payment token generation request corresponding to each consumption account, so that the token service provider respectively generates a payment token corresponding to each consumption account.

According to one or more embodiments of the present disclosure, the payment tokenization method of the embodiments of the present disclosure further includes:

after generating the digital currency sub-wallet corresponding to the target digital wallet and the target merchant, in response to a limit query request of the user for a sub-wallet to be queried, acquiring a sub-wallet limit of the sub-wallet to be queried, and sending the sub-wallet limit to the terminal for display; or, after generating the digital currency sub-wallet corresponding to the target digital wallet and the target merchant, receiving a limit modification request of the user, parsing the limit modification request, so as to obtain a sub-wallet to be adjusted of which the limit is to be adjusted, and a target limit thereof, and sending the sub-wallet to be adjusted and the target limit thereof to an operating system corresponding to the sub-wallet to be adjusted, so that the operating system corresponding to the sub-wallet to be adjusted adjusts a sub-wallet limit of the sub-wallet to be adjusted to the target limit.

According to one or more embodiments of the present disclosure, the payment tokenization method of the embodiments of the present disclosure further includes: before receiving the limit modification request of the user, acquiring the current limit of the sub-wallet to be adjusted, generating a sub-wallet limit management page according to the current limit of the sub-wallet to be adjusted, and sending the sub-wallet limit management page to the terminal for display, so that the user sets the target limit of the sub-wallet to be adjusted by means of an operation on the sub-wallet limit management page.

According to one or more embodiments of the present disclosure, the payment tokenization method of the embodiments of the present disclosure further includes: after generating the digital currency sub-wallet corresponding to the target digital wallet and the target merchant, in response to a payment request of the user based on a target sub-wallet, verifying the payment request to determine that an amount to be paid is less than or equal to a sub-wallet limit of the target sub-wallet.

According to one or more embodiments of the present disclosure, after receiving the payment token generation result returned by the token service provider, the method further includes: acquiring a risk control level of the target digital wallet and historical consumption data of the consumption account of the user in the target merchant; and determining, according to the historical consumption data of the consumption account and the risk control level, a payment limit of the payment token corresponding to the consumption account.

According to a second aspect of the embodiments of the present disclosure, provided is a payment method based on a digital currency sub-wallet, including: receiving a collection request sent by a target merchant background system in response to a consumption request of a user, wherein the collection request includes a payment token and a collection amount of the user, wherein a digital currency sub-wallet of the payment token corresponds to a target merchant;

determining, according to the payment token, a target operation mechanism background system corresponding to the digital currency sub-wallet, and sending a collection request message to the target operation mechanism background system; and receiving digital currency transferred from the target operation mechanism background system in response to the collection request message, and when it is verified that the transferred digital currency is consistent with the collection amount, pushing payment result information to the target merchant background system, so that the target merchant background system pushes payment success information to the user, wherein the payment token is generated according to the payment tokenization method provided in the first aspect of the embodiments of the present disclosure.

According to a third aspect of the embodiments of the present disclosure, provided is a payment tokenization apparatus based on a digital currency sub-wallet, including:

a request parsing module, configured to parse a payment token acquisition request of a user, so as to obtain a target digital wallet, a target merchant, and a wallet payment password corresponding to the target digital wallet;

a password verifying module, configured to send the wallet payment password to an operating system of the target digital wallet, so that the operating system of the target digital wallet verifies the wallet payment password, and receive a verification result returned by the operating system of the target digital wallet;

a sub-wallet opening module, configured to: in the case that the verification result is passed, send a sub-wallet opening request to the operating system of the target digital wallet, so that the operating system of the target digital wallet generates a digital currency sub-wallet corresponding to the target digital wallet and the target merchant, and receive a sub-wallet opening result returned by the operating system of the target digital wallet; and a token generating module, configured to: in the case that wallet opening is successful, send a payment token generation request to a token service provider, so that the token service provider generates a payment token corresponding to the digital currency sub-wallet, and receive a payment token generation result returned by the token service provider.

According to a fourth aspect of the embodiments of the present disclosure, provided is a payment tokenization system based on a digital currency sub-wallet, including: a digital wallet system, a token service provider and an operating system, wherein, the digital wallet system parses a payment token acquisition request of a user, so as to obtain a target digital wallet, a target merchant, and a wallet payment password corresponding to the target digital wallet; sends the wallet payment password to an operating system of the target digital wallet, so that the operating system of the target digital wallet verifies the wallet payment password;

in the case that the verification result is passed, the digital wallet system sends a sub-wallet opening request to the operating system of the target digital wallet, and the operating system of the target digital wallet generates a digital currency sub-wallet corresponding to the target digital wallet and the target merchant, and returns a sub-wallet opening result to the digital wallet system;

when judging according to the sub-wallet opening result that wallet opening is successful, the digital wallet system sends a payment token generation request to the token service provider; and the token service provider generates a payment token corresponding to the digital currency sub-wallet, and then returns a payment token generation result to the digital wallet system.

According to a fifth aspect of the embodiments of the present disclosure, provided is a payment tokenization electronic device based on a digital currency sub-wallet, including:

one or more processors; and a storage apparatus, configured to store one or more programs, wherein when the one or more programs are executed by the one or more processors, the one or more processors implement the method provided in the first aspect of the embodiments of the present disclosure.

According to a sixth aspect of the embodiments of the present disclosure, provided is a computer-readable medium, on which a computer program is stored, wherein the program, when being executed by a processor, implements the method provided in the first aspect of the embodiments of the present disclosure.

Further effects of the above-mentioned non-customary optional modes will be described below in conjunction with specific embodiments.

BRIEF DESCRIPTION OF THE DRAWINGS

The drawings are used to better understand the present disclosure, and do not constitute an improper limitation on the present disclosure, wherein.

DETAILED DESCRIPTION OF THE EMBODIMENTS

The exemplary embodiments of the present disclosure are described below in conjunction with the drawings, including various details of the embodiments of the present disclosure to facilitate the understanding, and they should be considered as exemplary only. Accordingly, those ordinary skilled in the art should be aware that various changes and modifications may be made to the embodiments described herein without departing from the scope and spirit of the present disclosure. Likewise, descriptions of well-known functions and structures are omitted in the following description for clarity and conciseness.

According to one aspect of the embodiments of the present disclosure, provided is a payment tokenization method based on a digital currency sub-wallet.

Figure 1:
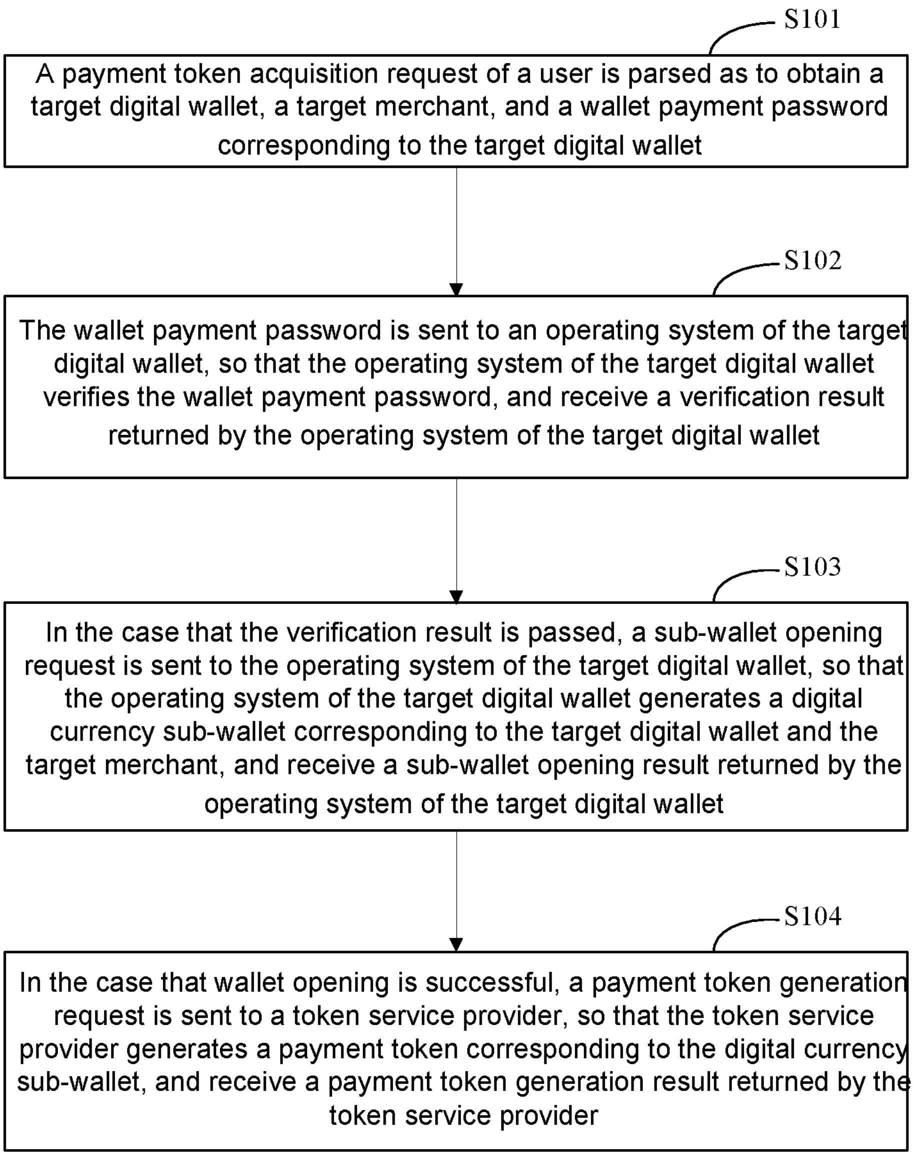
FIG. 1 is a schematic diagram of a main flow of a payment tokenization method based on a digital currency sub-wallet according to an embodiment of the present disclosure.

FIG. 1 is a schematic diagram of main flows of a payment tokenization method based on a digital currency sub-wallet according to an embodiment of the present disclosure, and as shown in FIG. 1, the payment tokenization method based on the digital currency sub-wallet includes:

Step S101, a payment token acquisition request of a user is parsed to obtain a target digital wallet, a target merchant, and a wallet payment password corresponding to the target digital wallet;

step S102, the wallet payment password is sent to an operating system of the target digital wallet, so that the operating system of the target digital wallet verifies the wallet payment password, and receiving a verification result returned by the operating system of the target digital wallet;

step S103, in the case that the verification result is passed, a sub-wallet opening request is sent to the operating system of the target digital wallet, so that the operating system of the target digital wallet generates a digital currency sub-wallet corresponding to the target digital wallet and the target merchant, and a sub-wallet opening result returned by the operating system of the target digital wallet is received; and step S104, in the case that wallet opening is successful, a payment token generation request is sent to a token service provider, so that the token service provider generates a payment token corresponding to the digital currency sub-wallet, and a payment token generation result returned by the token service provider is received.

The digital wallet refers to a digital currency wallet, and the operating system refers to a computer system that provides related services for the digital currency wallet, such as a computer system of a digital currency operation mechanism authorized by a digital currency issuing mechanism. The token service provider refers to a mechanism that provides a tokenization service, such as a TSP (Token Service provider). A merchant refers to one party that provides a commodity selling service by means of an electronic transaction, and a merchant account number refers to account information of the merchant, such as a mobile phone number, a bank card number, an account number of a digital currency wallet, and the like. A merchant mechanism system refers to a computer system of a mechanism that provides digital currency-related services for the merchant, such as a computer system of the digital currency operation mechanism authorized by the digital currency issuing mechanism. A merchant system refers to a computer system that provides a background service support for the merchant. Exemplarily, a seller a sells electronic products on an e-commerce platform A, and a digital currency account thereof is a digital currency account opened in a bank B. In this application scenario, the e-commerce platform A is the merchant, that provides the background service support for the e-commerce platform A is the merchant system, and a computer system, which provides related services for the digital currency wallet, is the bank B which is the merchant mechanism system.

The embodiments of the present disclosure involve digital currency, the payment token is used for replacing the account number of the digital currency wallet of the user for transaction authentication. The payment token is usually a Token, and in an actual application process, other tokens may also be used as payment tokens, so long as the token has uniqueness and may meet a transaction security requirement, therefore the implementation manner of the payment token is not specifically limited in the embodiments of the present disclosure.

In the embodiments of the present disclosure, sensitive real account information is replaced with a low-sensitivity payment token, so that the opportunity of each participant contacting the real account information in a payment link can be reduced, thereby reducing transaction risks caused by the leakage of the real account information, and enhancing the security of the transaction without affecting the transaction processing. Meanwhile, for one piece of real account information, a plurality of payment tokens may be correspondingly generated and are allocated to different scenarios, and further, a different validity period may be set for each payment token, so that it is convenient for the user to perform life cycle management on the payment token. In addition, the payment tokenization technology has a domain control function, and may set a personalized domain control attribute when each payment token is generated or by means of a later-period management interface, including, but not limited to, transaction channel restrictions, transaction limit settings, whether cross-border transactions are allowed, etc. The operating system to which the digital currency wallet belongs may set the domain control attribute for the payment token in a specific scenario according to the features of the transaction scenario, so as to further reduce the payment risks.

The method in the embodiments of the present disclosure is generally applied to a digital currency wallet server, and the user may initiate a payment tokenization request at a digital currency wallet terminal, and actively select different merchants from the perspective of payment wallet asset management, so as to establish a tokenization payment relationship (i.e., an association relationship between a digital currency sub-wallet, which corresponds to the digital currency wallet, and a corresponding merchant) and a centralized management tokenization payment relationship. By means of the method in the embodiments of the present disclosure, a tokenization relationship is pre-established before consumption, and a batch relationship of subscription merchants is realized, for example, payment tokenization services are opened for all merchants under the same group in a one-key manner, thereby greatly improving the convenience of the user using tokenization payment.

According to one or more embodiments of the present disclosure, before the payment token acquisition request of the user is received, a merchant list of the user is acquired from the token service provider and is sent to a terminal for display, so that the user selects one or more merchants from the merchant list as the target merchant. The merchant list refers to a list formed by one or more merchants. The merchant list may include all the merchants supported by the operating system, and may also only include merchants in which the user has consumer account numbers. Exemplarily, the user respectively has consumption account numbers on e-commerce platforms A, B and C, a merchant list including the e-commerce platforms A, B and C may be displayed to the user, and the user selects one or more e-commerce platforms therefrom as the target merchant. In an actual application process, before the merchant list is displayed to the user, a merchant in which the user has no consumption account in the merchant list, or a merchant in which the user has opened the payment tokenization service may be removed from the merchant list, so as to facilitate the selecting and viewing of the user. Further, the merchant list may be sorted, classified returned according to a certain rule, for example, the merchants are divided, according to purposes of the merchants, into merchants of a traffic travel class, a shopping class, an education and learning class, a social class, a financial planning class, etc.

According to one or more embodiments of the present disclosure, before the payment token acquisition request of the user is received, a digital wallet list of the user may be acquired and sent to the terminal for display, so that the user selects the target digital wallet from the digital wallet list. The digital wallet list refers to a list formed by some or all the digital currency wallets of the user. By means of presenting the digital currency wallet list to the user, it is convenient for the user to autonomously select a digital currency wallet account that needs to establish the payment token.

Further, after the digital wallet list of the user is acquired and sent to the terminal for display, in response to an operation of the user for selecting the target digital wallet from the digital wallet list, a merchant list corresponding to the target digital wallet may also be acquired and sent to the terminal for display, so that the user selects one or more merchants from the merchant list corresponding to the target digital wallet as the target merchant. In the present embodiment, according to the target digital wallet selected by the user, each merchant supported by the target digital wallet may be displayed for the user, and merchants, which are not supported by the target digital wallet, are filtered out.

It should be noted that the user may select one target digital wallet to establish a tokenization payment relationship with one or more target merchants, and may also select a plurality of target digital wallets to establish the tokenization payment relationship with one or more target merchants. For the target digital wallet and the target merchant, which have established the payment tokenization relationship, the target digital wallet may establish a payment tokenization relationship with one consumption account of the user in the target merchant, and may also establish a payment tokenization relationship with a plurality of consumption accounts of the user in the target merchant. The consumption account of the user in the target merchant may only refer to a consumption account which is opened in the target merchant by the user himself/herself, and may also refer to consumption accounts which are opened in the target merchant by other users (e.g., a mate, parents, children, friends and the like) having a specific relationship with the user, or a specified consumption account of the user in the target merchant (e.g., a consumption account input by the user when selecting the target merchant).

The embodiments of the present disclosure may share the payment capability of one digital wallet to the consumption accounts of a plurality of merchants, and may also be applied to scenarios such as "one digital wallet consumed by whole family", and a one-to-many combination relationship has an implementation basis of "smart contract" in the consumption field, and has relatively high expandability.

In step S102, the wallet payment password of the user is verified for verifying the identity of the user. The wallet payment password may be transmitted in a plaintext manner, and may also be transmitted in a ciphertext form, so as to ensure transaction security. According to one or more embodiments of the present disclosure, the payment tokenization method of the embodiments of the present disclosure further includes: before receiving the wallet payment password of the user, acquiring account information of the target merchant, verifying the account information of the target merchant, and confirming that the verification is passed. The account information of the target merchant may be, for example, an account name, a bound mobile phone number, and real name information and the like of the target merchant. The content for verifying the account information of the target merchant may be selectively set according to actual situations, for example, whether various pieces of account information of the target merchant are consistent (for example, whether the real name information of the target merchant is consistent with communication information such as a mobile phone number of the target merchant) is verified, and whether the account number of the target merchant is abnormal (for example, whether the account is closed down and frozen). By means of verifying the account information of the target merchant, the validity of the target merchant can be ensured before the digital currency sub-wallet is opened, on one hand, it is possible to avoid the situation in which the tokenization payment relationship cannot be established due to the problems of the account number of the target merchant being abnormal or the account number of the target merchant mismatching the target merchant and the like, and on the other hand, it is also possible to avoid the situation in which the establishment of the digital currency sub-wallet is continued when the above situation occurs, resulting in consumption of system resources.

In the actual application process, the merchant mechanism system to which the target merchant belongs may perform the verification, and the digital wallet system directly acquires the verification result from the merchant mechanism system to which the target merchant belongs; or, the digital wallet system acquires the account information of the target merchant from the merchant mechanism system to which the target merchant belongs, and then performs the verification according to the acquired information. The digital wallet system may directly acquire the account information of the target merchant from the merchant mechanism system to which the target merchant belongs, and may also acquire the account information of the target merchant from a local storage device. Exemplarily, the step of acquiring the account information of the target merchant includes: judging whether there is the account information of the target merchant in the local storage device; if so, acquiring the account information of the target merchant from the local storage device; and otherwise, acquiring the account information of the target merchant from the merchant mechanism system of the target merchant, and storing the acquired account information of the target merchant in the local storage device. By means of firstly acquiring the account information from the local storage device, the access frequency to the merchant mechanism system to which the target merchant belongs can be reduced, thereby reducing the consumption of network resources.

In the embodiments of the present disclosure, after generating the payment token corresponding to the digital currency sub-wallet, the token service provider may respectively push the payment token to the digital wallet system, the operating system of the target digital wallet, the merchant mechanism system of the target merchant, and the target merchant, etc.

According to one or more embodiments of the present disclosure, after generating the payment token corresponding to the digital currency sub-wallet, the token service provider pushes the payment token to the operating system of the target digital wallet; the operating system of the target digital wallet pushes the payment token to the merchant mechanism system of the target merchant; the merchant mechanism system of the target merchant pushes the payment token to a merchant server system of the target merchant; after receiving the payment token, the merchant server system of the target merchant returns a response message to the merchant mechanism system of the target merchant; after receiving the response message returned by the merchant server system of the target merchant, the merchant mechanism system of the target merchant returns the response message to the operating system of the target digital wallet; after receiving the response message returned by the merchant mechanism system of the target merchant, the operating system of the target digital wallet returns the response message to the token service provider; and after receiving the response message returned by the operating system of the target digital wallet, the token service provider generates the payment token generation result.

The target merchant, the merchant mechanism system to which the target merchant belongs and the digital wallet system generally belong to different computer systems, and the merchant mechanism system of the target merchant pushes the payment token to the target merchant, so that the difficulty of cross-system communication can be reduced, and implementation is facilitated. The mode in which the merchant mechanism system of the target merchant pushes the payment token to the target merchant may be selectively set according to actual situations, for example, the merchant server system of the target merchant pushes the payment token to a merchant terminal of the target merchant, so that the merchant terminal of the target merchant displays the message pushed by the merchant server system of the target merchant. The merchant server system of the target merchant may push the payment token to the merchant terminal of the target merchant by using push information, wherein the push information is also called service information or push-in information, which is a short message in a special format. The push information is a message push mode capable of directly touching the user, and is low in cost and diverse in style.

For a pair of target digital wallet and target merchant, which establish the payment tokenization relationship, the target digital wallet may establish the payment tokenization relationship with a plurality of consumption accounts of the user in the target merchant.

In one or more embodiments of the present disclosure, for a pair of target digital wallet and target merchant, which establish the payment tokenization relationship, one digital currency sub-wallet corresponding to all the consumption accounts in the corresponding target merchant may be established in the target digital wallet, that is, all the consumption accounts in the target merchant share one digital currency sub-wallet. Exemplarily, before sending the sub-wallet opening request to the operating system of the target digital wallet, it is confirmed that there is no digital currency sub-wallet corresponding to the target digital wallet and the target merchant. In this way, it can be ensured that there is only one digital currency sub-wallet in one target merchant, thereby facilitating the management of the user.

In one or more embodiments of the present disclosure, for a pair of target digital wallet and target merchant, which establish the payment tokenization relationship, one digital currency sub-wallet respectively corresponding to each consumption account in the corresponding target merchant is established in the target digital wallet, that is, one consumption account corresponds to one digital currency sub-wallet. For example, the payment token acquisition request includes a plurality of consumption accounts of the user in the target merchant, and the step of sending the payment token generation request to the token service provider includes: respectively sending, to the token service provider, the payment token generation request corresponding to each consumption account, so that the token service provider respectively generates a payment token corresponding to each consumption account. In this way, it can be ensured that one consumption account in the target merchant corresponds to one digital currency sub-wallet, and thus it is convenient for the user to perform diversified management for different consumption accounts.

Figure 2A:
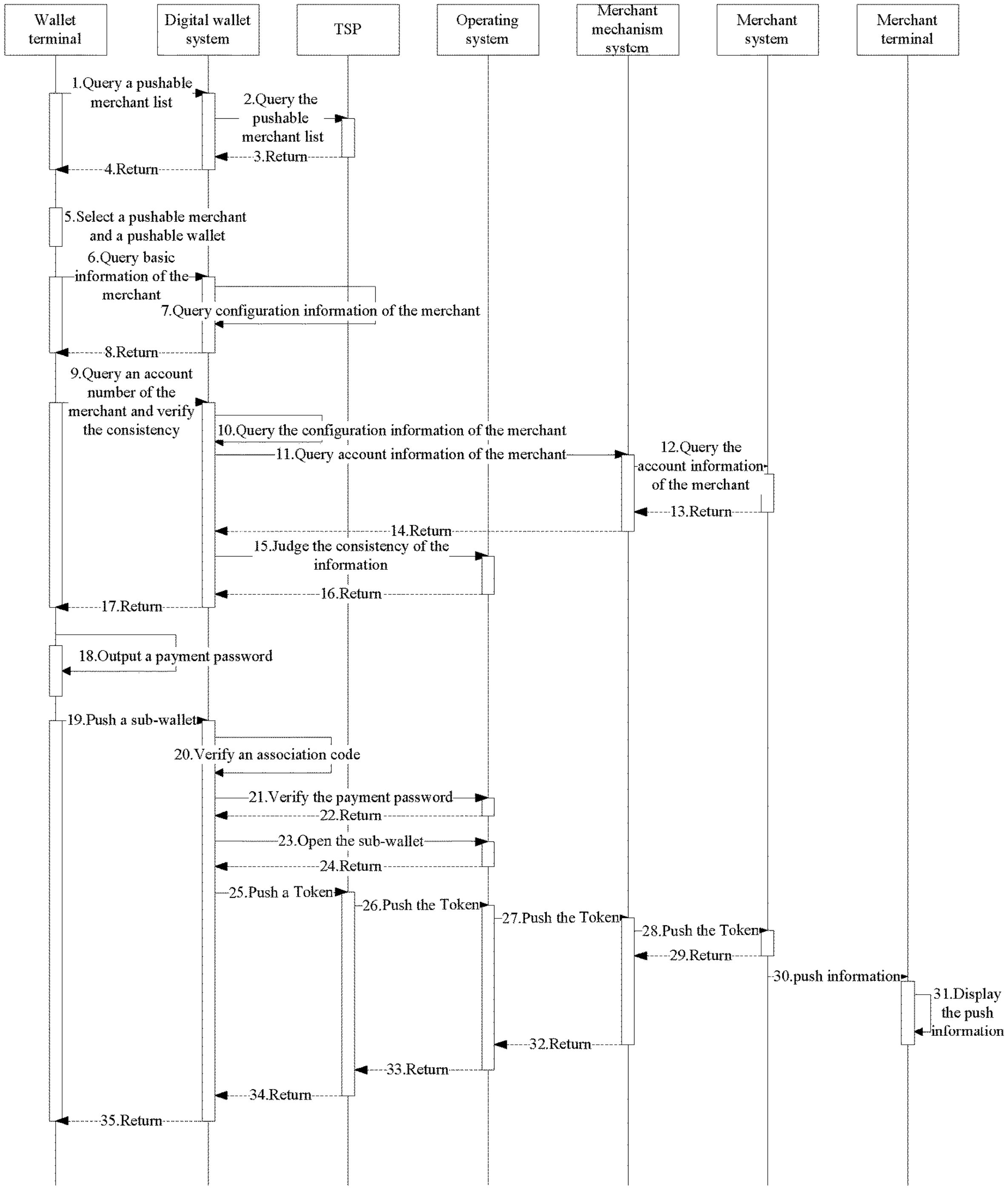
FIG. 2*a* and FIG. 2*b* are schematic diagrams of main flows of a payment tokenization method based on a digital currency sub-wallet in one or more embodiments of the present disclosure.

FIG. 2*a* is a schematic diagram of main flows of a payment tokenization method based on a digital currency sub-wallet in one or more embodiments of the present disclosure. In the present embodiment, an executive body for executing the payment tokenization method in the embodiment of the present disclosure is a digital wallet system. As shown in FIG. 2*a*, the main flows of the payment tokenization method based on the digital currency sub-wallet include:

1. A digital wallet terminal (hereinafter referred to as App) requests the digital wallet system by means of an interface, so as to query a pushable merchant list.
2. The digital wallet system queries the pushable merchant list from a TSP.
3. The TSP sorts and classifies the pushable merchant list according to a certain rule, and then returns same to the digital wallet system.
4. The digital wallet system sorts and classifies the pushable merchant list according to a certain rule, and then returns same to the App.
5. A user selects a pushable merchant and a pushable wallet on the App. Here, the user may select a plurality of merchants for batch push, and may also select a plurality of consumption account numbers of the same merchant for push.
6. The App queries account information of the merchant from the digital wallet system.
7. The digital wallet system queries basic configuration information of the merchant from a local storage device or a merchant mechanism system.
8. The digital wallet system returns the queried basic configuration information of the merchant to the App.
9. The user requests the digital wallet system by means of the App, so as to query the consistency between a merchant account number and merchant account information.
10. The digital wallet system queries the basic configuration information of the merchant from the local storage device or the merchant mechanism system.
11. The digital wallet system queries the merchant account information from the merchant mechanism system.
12. The merchant mechanism system queries the merchant account information from a merchant system.
13. The merchant system returns the merchant account information to the merchant mechanism system.
14. The merchant mechanism system returns the merchant account information to the digital wallet system.
15. The digital wallet system requests an operating system to judge the consistency between real name information and a mobile phone number of the merchant.
16. The operating system returns a judgment result to the digital wallet system.
17. The digital wallet system returns the judgment result to the App.
18. The user inputs a payment password by means of the App.
19. The App sends ciphertext of the input wallet payment password to the digital wallet system, and sends a sub-wallet push request.
20. The digital wallet system verifies an association code (for example, a dynamic verify code, and the like) when the App sends the sub-wallet push request.
21. After the verification is passed, the digital wallet system requests the operating system to verify the payment password input by the user.
22. The operating system returns a verification result to the digital wallet system.
23. When the verification result is that the verification is passed, the digital wallet system sends a sub-wallet opening request to the operating system.
24. After opening a digital currency sub-wallet, the operating system returns sub-wallet information to the digital wallet system.
25. The digital wallet system sends and pushes, to the TSP, a Token request corresponding to the sub-wallet information, so as to request the TSP to generate a payment Token for the digital currency sub-wallet.

26-31. After generating the Token, the TSP pushes the Token to the merchant, wherein the Token is synchronously sent to the operating system, the merchant mechanism system and the merchant system. The merchant system pushes the Token to the merchant terminal by means of push information, and the merchant terminal displays the push information to the merchant.

32-35. After pushing the Token to the merchant system, the merchant mechanism system receives push result information returned by the merchant system. The merchant mechanism system returns the push result information to the operating system, and the operating system returns the push result information to the TSP. The TSP returns the push result information to the digital wallet system. The digital wallet system returns the push result information to the App, so as to prompt the user to complete sub-wallet binding and push.

Figure 2B:
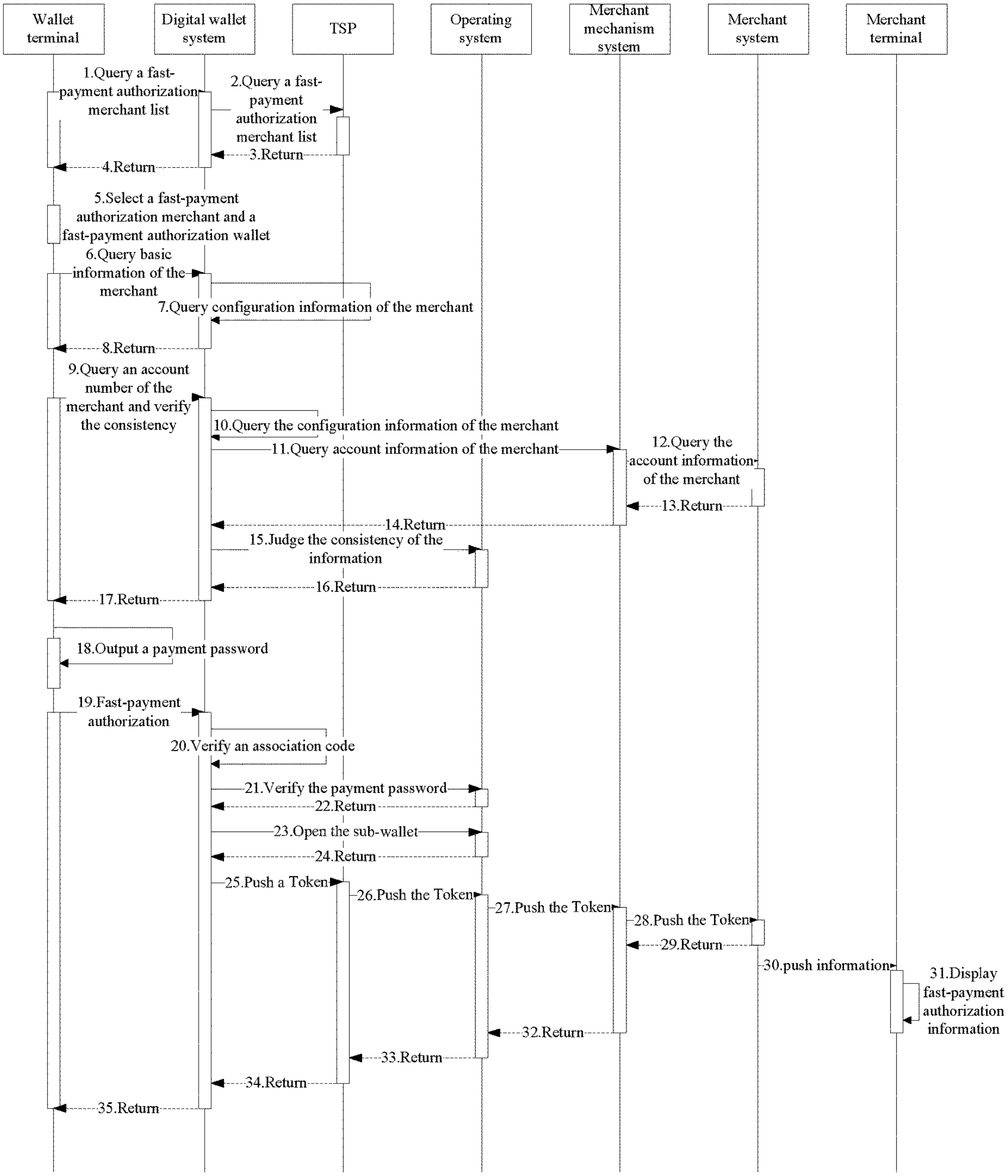

In the embodiments of the present disclosure, the process of pushing the sub-wallet to the merchant may also be referred to as a process of fast payment authorization for the merchant, and the pushable merchant may also be referred to as a fast-payment authorization merchant, as shown in FIG. 2*b*, the executive body for executing the payment tokenization method in the embodiment of the present disclosure is a digital wallet system, and the main flows of the payment tokenization method based on the digital currency sub-wallet include:

1. A digital wallet terminal (hereinafter referred to as App) requests the digital wallet system by means of an interface, so as to query a fast-payment authorization merchant list.
2. The digital wallet system queries the fast-payment authorization merchant list from a TSP.
3. The TSP sorts and classifies the fast-payment authorization merchant list according to a certain rule, and then returns same to the digital wallet system.
4. The digital wallet system sorts and classifies the fast-payment authorization merchant list according to a certain rule, and then returns same to the App.
5. A user selects a fast-payment authorization merchant and a fast-payment authorization wallet on the App. Here, the user may select a plurality of merchants for batch fast-payment authorization, and may also select a plurality of consumption account numbers of the same merchant for fast-payment authorization.
6. The App queries account information of the merchant from the digital wallet system.
7. The digital wallet system queries basic configuration information of the merchant from a local storage device or a merchant mechanism system.
8. The digital wallet system returns the queried basic configuration information of the merchant to the App.
9. The user requests the digital wallet system by means of the App, so as to query the consistency between a merchant account number and merchant account information.
10. The digital wallet system queries the basic configuration information of the merchant from the local storage device or the merchant mechanism system.
11. The digital wallet system queries the merchant account information from the merchant mechanism system.
12. The merchant mechanism system queries the merchant account information from a merchant system.
13. The merchant system returns the merchant account information to the merchant mechanism system.
14. The merchant mechanism system returns the merchant account information to the digital wallet system.
15. The digital wallet system requests an operating system to judge the consistency between real name information and a mobile phone number of the merchant.
16. The operating system returns a judgment result to the digital wallet system.
17. The digital wallet system returns the judgment result to the App.
18. The user inputs a payment password by means of the App.
19. The App sends ciphertext of the input wallet payment password to the digital wallet system, and sends a fast-payment authorization request.
20. The digital wallet system verifies an association code (for example, a dynamic verify code, and the like) when the App sends the fast-payment authorization request.
21. After the verification is passed, the digital wallet system requests the operating system to verify the payment password input by the user.
22. The operating system returns a verification result to the digital wallet system.
23. When the verification result is that the verification is passed, the digital wallet system sends a sub-wallet opening request to the operating system.
24. After opening a digital currency sub-wallet, the operating system returns sub-wallet information to the digital wallet system.
25. The digital wallet system sends and pushes, to the TSP, a Token request corresponding to the sub-wallet information, so as to request the TSP to generate a payment Token for the digital currency sub-wallet.

26-31. After generating the Token, the TSP pushes the Token to the merchant, wherein the Token is synchronously sent to the operating system, the merchant mechanism system and the merchant system. The merchant system pushes the Token to the merchant terminal by means of push information, and the merchant terminal displays the fast-payment authorization information to the merchant.

32-35. After pushing the Token to the merchant system, the merchant mechanism system receives fast-payment authorization result information returned by the merchant system. The merchant mechanism system returns the fast-payment authorization result information to the operating system, and the operating system returns the fast-payment authorization result information to the TSP. The TSP returns the fast-payment authorization result information to the digital wallet system. The digital wallet system returns the fast-payment authorization result information to the App, so as to prompt the user to complete fast-payment authorization.

After the digital currency sub-wallet corresponding to the target digital wallet and the target merchant is generated, in response to a payment request of the user based on a target sub-wallet, the payment request may be verified to determine that an amount to be paid is less than or equal to the sub-wallet limit of the target sub-wallet, thereby facilitating diversified management on the consumption limit of each digital currency sub-wallet.

In the actual application process, after the digital currency sub-wallet corresponding to the target digital wallet and the target merchant is generated, in response to a limit query request of the user for a sub-wallet to be queried, a sub-wallet limit of the sub-wallet to be queried may also be acquired and sent to the terminal for display; or, after the digital currency sub-wallet corresponding to the target digital wallet and the target merchant is generated, a limit modification request of the user is received, a sub-wallet to be adjusted of which the limit is to be adjusted, and a target limit thereof are parsed from the limit modification request, the sub-wallet to be adjusted and the target limit thereof are sent to an operating system corresponding to the sub-wallet to be adjusted, so that the operating system corresponding to the sub-wallet to be adjusted adjusts the sub-wallet limit of the sub-wallet to be adjusted to the target limit. Exemplarily, before the limit modification request of the user is received, the current limit of the sub-wallet to be adjusted is acquired, a sub-wallet limit management page is generated according to the current limit of the sub-wallet to be adjusted and is sent to the terminal for display, so that the user sets the target limit of the sub-wallet to be adjusted by means of an operation on the sub-wallet limit management page.

Figure 3:
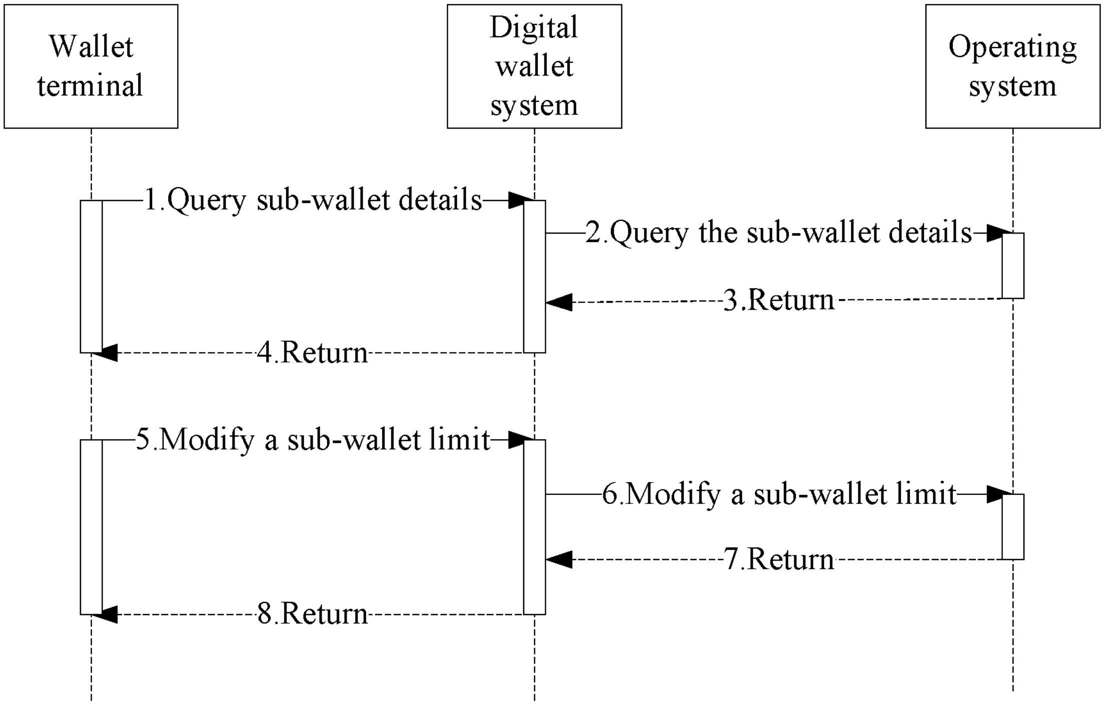
FIG. 3 is a schematic diagram of main flows of modifying a sub-wallet limit in one or more embodiments of the present disclosure.

FIG. 3 is a schematic diagram of main flows of modifying a sub-wallet limit in one or more embodiments of the present disclosure. As shown in FIG. 3, sub-wallet limit management flows include:

1. The user queries sub-wallet details from the digital wallet system by means of the digital wallet terminal.
2. The digital wallet system queries the sub-wallet details from the operating system.
3. The operating system returns the sub-wallet details to the digital wallet system.
4. The digital wallet system returns the sub-wallet details to the digital wallet terminal. The user enters a certain sub-wallet management page by means of the digital wallet terminal.
5. The user adjusts the limit of a sub-wallet by means of dragging the page. The limit includes a daily limit and a single-transaction limit. The user may also perform differential limit management on a plurality of Tokens under the same digital currency sub-wallet. The user sends a sub-wallet limit modification request to the digital wallet system by means of the digital wallet terminal.
6. The digital wallet system sends the sub-wallet limit modification request to the operating system.
7. The operating system modifies the limit of the corresponding digital currency sub-wallet according to the sub-wallet limit modification request, and then returns result information to the digital wallet system. After verifying the payment password input by the user, a wallet operation mechanism system adjusts the limit of the digital currency sub-wallet for the merchant to the latest set numerical value of the user.
8. A digital wallet server returns the result information to the digital wallet terminal.

After receiving the payment token generation result returned by the token service provider, the method may further include: acquiring a risk control level of the target digital wallet and historical consumption data of the consumption account of the user in the target merchant; and determining, according to the historical consumption data (e.g., a purchase record, shopping cart adding record, a browsing record, an attention record, and other data) of the consumption account and the risk control level, a payment limit of the payment token corresponding to the consumption account. Exemplarily, the user may open any one of five types of wallet accounts according to his/her own needs, each type of wallet account requires different user information for opening, and has different corresponding permissions, that is, has different risk control levels.

Based on the "one-to-many" tokenization payment relationship, the method in the embodiments of the present disclosure may realize more refined limit management, and may set different payment limits for different payment tokenization relationships in view of the historical consumption data of different consumption accounts and in combination with the risk control level of the corresponding digital wallet, thereby improving the security of the tokenization payment.

According to a second aspect of the embodiments of the present disclosure, provided is a payment method based on a digital currency sub-wallet, including: receiving a collection request sent by a target merchant background system in response to a consumption request of a user, wherein the collection request includes a payment mark of a digital currency sub-wallet corresponding to a target merchant, and a collection amount, of the user;

determining, according to the payment token, a target operation mechanism background system corresponding to the digital currency sub-wallet, and sending a collection request message to the target operation mechanism background system; and receiving digital currency transferred from the target operation mechanism background system in response to the collection request message, and when it is verified that the transferred digital currency is consistent with the collection amount, pushing payment result information to the target merchant background system, so that the target merchant background system pushes payment success information to the user, wherein the payment token is generated according to the payment tokenization method provided in the first aspect of the embodiments of the present disclosure.

Consumption flows of the digital currency sub-wallet include:

1. When consuming in a target merchant, the user may select a Token of a bound digital wallet for payment.
2. A merchant system finds the Token corresponding to the user, and then sends the Token to a merchant mechanism system for collection.
3. The merchant mechanism system finds, according to a record, an operating system of the digital wallet corresponding to the Token, and sends a collection request message.
4. After receiving the collection request packet, the operating system pays to a merchant wallet provided in the collection request message. The merchant mechanism system returns a payment result to a merchant server.
5. A merchant system prompts the user or the target merchant that the payment is successful.

According to a third aspect of the embodiments of the present disclosure, provided is an apparatus for implementing the above method.

Figure 4:
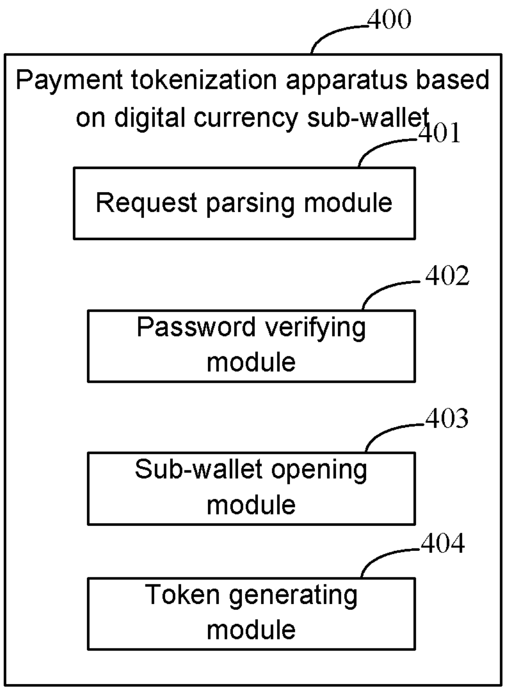
FIG. 4 is a schematic diagram of main modules of a payment tokenization apparatus based on a digital currency sub-wallet according to an embodiment of the present disclosure.

FIG. 4 is a schematic diagram of main modules of a payment tokenization apparatus based on a digital currency sub-wallet according to an embodiment of the present disclosure. As shown in FIG. 4, the payment tokenization apparatus 400 based on the digital currency sub-wallet includes:

a request parsing module 401, configured to parse a payment token acquisition request of a user, so as to obtain a target digital wallet, a target merchant, and a wallet payment password corresponding to the target digital wallet;

a password verifying module 402, configured to send the wallet payment password to an operating system of the target digital wallet, so that the operating system of the target digital wallet verifies the wallet payment password, and receive a verification result returned by the operating system of the target digital wallet;

a sub-wallet opening module 403, configured to: in the case that the verification result is passed, send a sub-wallet opening request to the operating system of the target digital wallet, so that the operating system of the target digital wallet generates a digital currency sub-wallet corresponding to the target digital wallet and the target merchant, and receive a sub-wallet opening result returned by the operating system of the target digital wallet; and a token generating module 404, configured to: in the case that wallet opening is successful, send a payment token generation request to a token service provider, so that the token service provider generates a payment token corresponding to the digital currency sub-wallet, and receive a payment token generation result returned by the token service provider.

According to one or more embodiments of the present disclosure, the request parsing module is further configured to: before receiving the payment token acquisition request of the user, acquire a merchant list of the user from the token service provider and send the merchant list to a terminal for display, so that the user selects one or more merchants from the merchant list as the target merchant, or, before receiving the payment token acquisition request of the user, acquire a digital wallet list of the user and send the digital wallet list to the terminal for display, so that the user selects the target digital wallet from the digital wallet list.

According to one or more embodiments of the present disclosure, the request parsing module is further configured to: after acquiring the digital wallet list of the user and sending the digital wallet list to the terminal for display, in response to an operation of the user for selecting the target digital wallet from the digital wallet list, acquire a merchant list corresponding to the target digital wallet, and send the merchant list to the terminal for display, so that the user selects one or more merchants from the merchant list corresponding to the target digital wallet as the target merchant.

According to one or more embodiments of the present disclosure, the password verifying module is further configured to: after the user selects one or more merchants from the merchant list as the target merchant, acquire account information of the target merchant, verify the account information of the target merchant, and confirm that the verification is passed.

According to one or more embodiments of the present disclosure, the password verifying module acquiring the account information of the target merchant includes:

judging whether there is the account information of the target merchant in a local storage device; if so, acquiring the account information of the target merchant from the local storage device; and otherwise, acquiring the account information of the target merchant from a merchant mechanism system of the target merchant, and storing the acquired account information of the target merchant in the local storage device.

According to one or more embodiments of the present disclosure, the password verifying module verifying the account information of the target merchant includes: verifying whether real name information of the target merchant is consistent with communication information of the target merchant; if so, the verification is passed; and otherwise, the verification is not passed.

According to one or more embodiments of the present disclosure, after generating the payment token corresponding to the digital currency sub-wallet, the token service provider pushes the payment token to the operating system of the target digital wallet; the operating system of the target digital wallet pushes the payment token to the merchant mechanism system of the target merchant; the merchant mechanism system of the target merchant pushes the payment token to a merchant server system of the target merchant;

after receiving the payment token, the merchant server system of the target merchant returns a response message to the merchant mechanism system of the target merchant; after receiving the response message returned by the merchant server system of the target merchant, the merchant mechanism system of the target merchant returns the response message to the operating system of the target digital wallet; after receiving the response message returned by the merchant mechanism system of the target merchant, the operating system of the target digital wallet returns the response message to the token service provider; after receiving the response message returned by the operating system of the target digital wallet, the token service provider generates the payment token generation result; and wherein the merchant server system of the target merchant pushes the payment token to a merchant terminal of the target merchant by using push information, so that the merchant terminal of the target merchant displays the message pushed by the merchant server system of the target merchant.

According to one or more embodiments of the present disclosure, the sub-wallet opening module is further configured to: before sending the sub-wallet opening request to the operating system of the target digital wallet, confirm that there is no digital currency sub-wallet corresponding to the target digital wallet and the target merchant.

According to one or more embodiments of the present disclosure, the payment token acquisition request includes: a plurality of consumption accounts of the user in the target merchant; and the token generating module sending the payment token generation request to the token service provider includes: respectively sending, to the token service provider, the payment token generation request corresponding to each consumption account, so that the token service provider respectively generates a payment token corresponding to each consumption account.

According to one or more embodiments of the present disclosure, the apparatus of the embodiments of the present disclosure further includes a limit management module, configured to:

after generating the digital currency sub-wallet corresponding to the target digital wallet and the target merchant, in response to a limit query request of the user for a sub-wallet to be queried, acquire a sub-wallet limit of the sub-wallet to be queried, and send the sub-wallet limit to the terminal for display; or, after generating the digital currency sub-wallet corresponding to the target digital wallet and the target merchant, receive a limit modification request of the user, parse the limit modification request, so as to obtain a sub-wallet to be adjusted of which the limit is to be adjusted, and a target limit thereof, and send the sub-wallet to be adjusted and the target limit thereof to an operating system corresponding to the sub-wallet to be adjusted, so that the operating system corresponding to the sub-wallet to be adjusted adjusts the sub-wallet limit of the sub-wallet to be adjusted to the target limit.

According to one or more embodiments of the present disclosure, the limit management module is further configured to: before receiving the limit modification request of the user, acquire the current limit of the sub-wallet to be adjusted, generate a sub-wallet limit management page according to the current limit of the sub-wallet to be adjusted, and send the sub-wallet limit management page to the terminal for display, so that the user sets the target limit of the sub-wallet to be adjusted by means of an operation on the sub-wallet limit management page.

According to one or more embodiments of the present disclosure, the apparatus of the embodiments of the present disclosure further includes a payment management module, configured to: after generating the digital currency sub-wallet corresponding to the target digital wallet and the target merchant, in response to a payment request of the user based on a target sub-wallet, verify the payment request to determine that an amount to be paid is less than or equal to the sub-wallet limit of the target sub-wallet.

According to one or more embodiments of the present disclosure, the apparatus of the embodiments of the present disclosure further includes a limit management module, configured to: after receiving the payment token generation result returned by the token service provider, acquire a risk control level of the target digital wallet and historical consumption data of the consumption account of the user in the target merchant; and determine, according to the historical consumption data of the consumption account and the risk control level, a payment limit of the payment token corresponding to the consumption account.

According to a fourth aspect of the embodiments of the present disclosure, provided is a system for implementing the above method.

Figure 5:
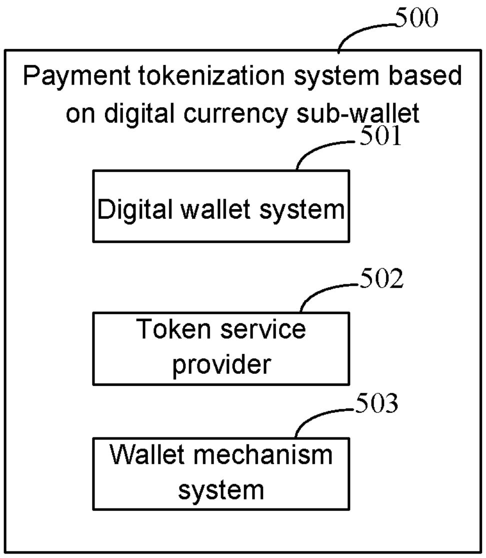
FIG. 5 is a schematic diagram of a main composition of a payment tokenization system based on a digital currency sub-wallet according to an embodiment of the present disclosure.

FIG. 5 is a schematic diagram of a main composition of a payment tokenization system based on a digital currency sub-wallet according to an embodiment of the present disclosure. As shown in FIG. 5, the payment tokenization system 500 based on the digital currency sub-wallet includes a digital wallet system 501, a token service provider 502 and an operating system 503, wherein, the digital wallet system 501 parses a payment token acquisition request of a user, so as to obtain a target digital wallet, a target merchant, and a wallet payment password corresponding to the target digital wallet; sends the wallet payment password to the operating system 503 of the target digital wallet, so that the operating system 503 of the target digital wallet verifies the wallet payment password;

in the case that the verification result is passed, the digital wallet system 501 sends a sub-wallet opening request to the operating system 503 of the target digital wallet, and the operating system 503 of the target digital wallet generates a digital currency sub-wallet corresponding to the target digital wallet and the target merchant, and returns a sub-wallet opening result to the digital wallet system 501;

when judging according to the sub-wallet opening result that wallet opening is successful, the digital wallet system 501 sends a payment token generation request to the token service provider 502; and the token service provider 502 generates a payment token corresponding to the digital currency sub-wallet, and then returns a payment token generation result to the digital wallet system 501.

According to one or more embodiments of the present disclosure, the digital wallet system is further configured to:

before receiving the payment token acquisition request of the user, acquire a merchant list of the user from the token service provider and send the merchant list to a terminal for display, so that the user selects one or more merchants from the merchant list as the target merchant; or, before receiving the payment token acquisition request of the user, acquire a digital wallet list of the user and send the digital wallet list to the terminal for display, so that the user selects the target digital wallet from the digital wallet list.

According to one or more embodiments of the present disclosure, the digital wallet system is further configured to:

after acquiring the digital wallet list of the user and sending the digital wallet list to the terminal for display, in response to an operation of the user for selecting the target digital wallet from the digital wallet list, acquire a merchant list corresponding to the target digital wallet, and send the merchant list to the terminal for display, so that the user selects one or more merchants from the merchant list corresponding to the target digital wallet as the target merchant.

According to one or more embodiments of the present disclosure, the digital wallet system is further configured to: after the user selects one or more merchants from the merchant list as the target merchant, acquire account information of the target merchant, verify the account information of the target merchant, and confirm that the verification is passed.

According to one or more embodiments of the present disclosure, the digital wallet system acquiring the account information of the target merchant includes:

judging whether there is the account information of the target merchant in a local storage device; if so, acquiring the account information of the target merchant from the local storage device; and otherwise, acquiring the account information of the target merchant from a merchant mechanism system of the target merchant, and storing the acquired account information of the target merchant in the local storage device.

According to one or more embodiments of the present disclosure, the digital wallet system verifying the account information of the target merchant includes: verifying whether real name information of the target merchant is consistent with communication information of the target merchant; if so, the verification is passed; and otherwise, the verification is not passed.

According to one or more embodiments of the present disclosure, after generating the payment token corresponding to the digital currency sub-wallet, the token service provider pushes the payment token to the operating system of the target digital wallet; the operating system of the target digital wallet pushes the payment token to the merchant mechanism system of the target merchant; the merchant mechanism system of the target merchant pushes the payment token to a merchant server system of the target merchant;

after receiving the payment token, the merchant server system of the target merchant returns a response message to the merchant mechanism system of the target merchant; after receiving the response message returned by the merchant server system of the target merchant, the merchant mechanism system of the target merchant returns the response message to the operating system of the target digital wallet; after receiving the response message returned by the merchant mechanism system of the target merchant, the operating system of the target digital wallet returns the response message to the token service provider; after receiving the response message returned by the operating system of the target digital wallet, the token service provider generates the payment token generation result; and wherein the merchant server system of the target merchant pushes the payment token to a merchant terminal of the target merchant, so that the merchant terminal of the target merchant displays the message pushed by the merchant server system of the target merchant.

According to one or more embodiments of the present disclosure, the digital wallet system is further configured to: before sending the sub-wallet opening request to the operating system of the target digital wallet, confirm that there is no digital currency sub-wallet corresponding to the target digital wallet and the target merchant.

According to one or more embodiments of the present disclosure, the payment token acquisition request includes: a plurality of consumption accounts of the user in the target merchant; and the digital wallet system sending the payment token generation request to the token service provider includes: respectively sending, to the token service provider, the payment token generation request corresponding to each consumption account, so that the token service provider respectively generates a payment token corresponding to each consumption account.

According to one or more embodiments of the present disclosure, the digital wallet system is further configured to:

after generating the digital currency sub-wallet corresponding to the target digital wallet and the target merchant, in response to a limit query request of the user for a sub-wallet to be queried, acquire a sub-wallet limit of the sub-wallet to be queried, and send the sub-wallet limit to the terminal for display; or, after generating the digital currency sub-wallet corresponding to the target digital wallet and the target merchant, receive a limit modification request of the user, parse the limit modification request, so as to obtain a sub-wallet to be adjusted of which the limit is to be adjusted, and a target limit thereof, and send the sub-wallet to be adjusted and the target limit thereof to an operating system corresponding to the sub-wallet to be adjusted, so that the operating system corresponding to the sub-wallet to be adjusted adjusts the sub-wallet limit of the sub-wallet to be adjusted to the target limit.

According to one or more embodiments of the present disclosure, the digital wallet system is further configured to: before receiving the limit modification request of the user, acquire the current limit of the sub-wallet to be adjusted, generate a sub-wallet limit management page according to the current limit of the sub-wallet to be adjusted, and send the sub-wallet limit management page to the terminal for display, so that the user sets the target limit of the sub-wallet to be adjusted by means of an operation on the sub-wallet limit management page.

According to one or more embodiments of the present disclosure, the digital wallet system is further configured to: after generating the digital currency sub-wallet corresponding to the target digital wallet and the target merchant, in response to a payment request of the user based on a target sub-wallet, verify the payment request to determine that an amount to be paid is less than or equal to the sub-wallet limit of the target sub-wallet.

According to one or more embodiments of the present disclosure, the digital wallet system is further configured to: after receiving the payment token generation result returned by the token service provider, acquire a risk control level of the target digital wallet and historical consumption data of the consumption account of the user in the target merchant; and determine, according to the historical consumption data of the consumption account and the risk control level, a payment limit of the payment token corresponding to the consumption account.

According to a fifth aspect of the embodiments of the present disclosure, provided is a payment tokenization electronic device based on a digital currency sub-wallet, including:

one or more processors; and a storage apparatus, configured to store one or more programs, wherein when the one or more programs are executed by the one or more processors, the one or more processors implement the method provided in the first aspect of the embodiments of the present disclosure.

According to a sixth aspect of the embodiments of the present disclosure, provided is a computer-readable medium, on which a computer program is stored, wherein the program, when being executed by a processor, implements the method provided in the first aspect of the embodiments of the present disclosure.

Figure 6:
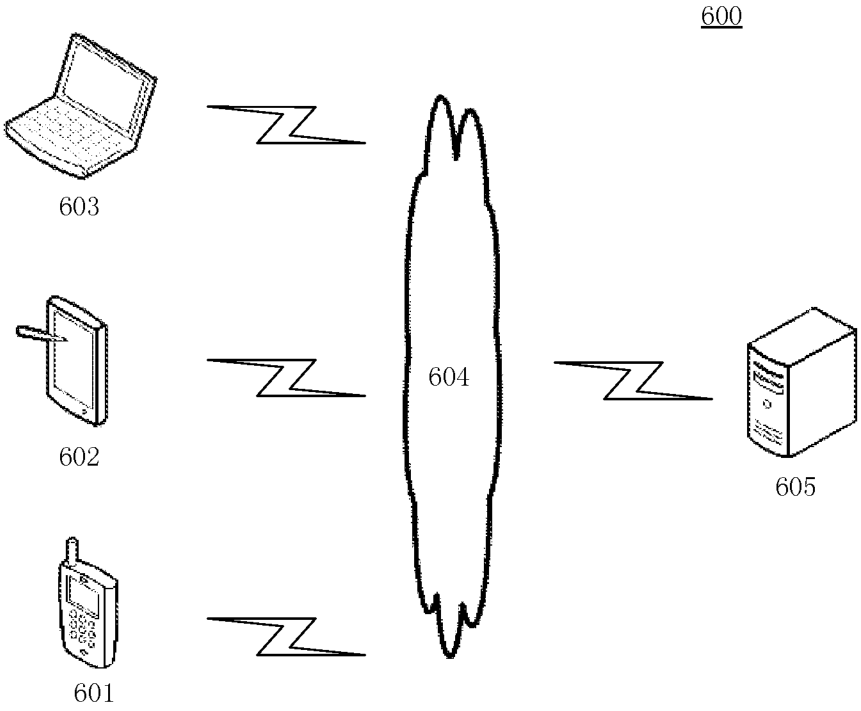
FIG. 6 is a diagram of an exemplary system architecture to which an embodiment of the present disclosure may be applied.

FIG. 6 illustrates an exemplary system architecture 600 to which the payment tokenization method based on the digital currency sub-wallet or the payment tokenization device based on the digital currency sub-wallet according to the embodiments of the present disclosure may be applied.

As shown in FIG. 6, the system architecture 600 may include terminal devices 601, 602 and 603, a network 604, and a server 605. The network 604 is used for providing a medium of a communication link between the terminal devices 601, 602 and 603 and the server 605. The network 604 may include various connection types, such as wired, wireless communication links, optical fiber cables, and the like.

The user may use the terminal devices 601, 602 and 603 to interact with the server 605 by means of the network 604, so as to receive or send messages, etc. Various communication client applications, such as shopping applications, webpage browser applications, search applications, instant messaging tools, mailbox clients, social platform software, and the like, may be installed on the terminal devices 601, 602 and 603 (merely examples).

The terminal devices 601, 602 and 603 may be various electronic devices, which have display screens and support webpage browsing, including, but not limited to, smart phones, tablet computers, laptop portable computers, desktop computers, etc.

The server 605 may be a server that provides various services, such as a background management server (only an example), which provides a support for shopping websites browsed by the user using the terminal devices 601, 602 and 603. The background management server may analyze data such as a received product information query request, and feed back a processing result (e.g., target push information, product information, which are only examples) to the terminal devices.

It should be noted that, the payment tokenization method based on the digital currency sub-wallet provided in the embodiments of the present disclosure is generally executed by the server 605, and correspondingly, the payment tokenization apparatus based on the digital currency sub-wallet is generally disposed in the server 605.

It should be understood that, the numbers of terminal devices, networks and servers in FIG. 6 are merely illustrative. According to implementation requirements, there may be any numbers of terminal devices, networks and servers.

Figure 7:
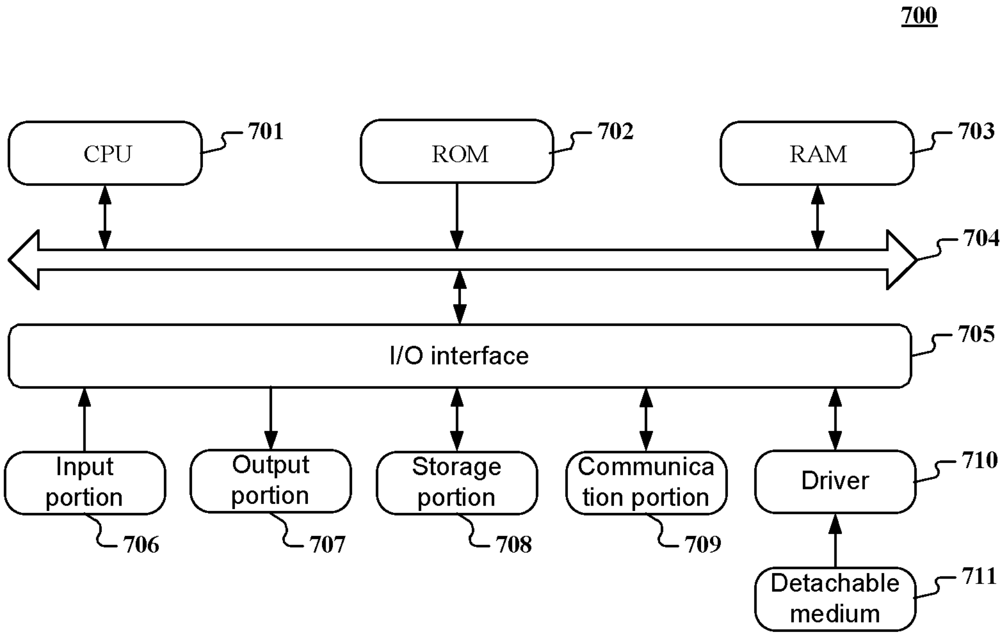
FIG. 7 is a schematic structural diagram of a computer system of a terminal device or a server suitable for implementing an embodiment of the present disclosure.

Referring to FIG. 7, it illustrates a schematic structural diagram of a computer system 700 of a terminal device suitable for implementing the embodiments of the present disclosure. The terminal device illustrated in FIG. 7 is merely an example, and should not bring any limitation to the functions and use ranges of the embodiments of the present disclosure.

As shown in FIG. 7, the computer system 700 includes a central processing unit (CPU) 701, which may perform various suitable actions and processes in accordance with a program stored in a read-only memory (ROM) 702 or a program loaded from a storage portion 708 into a random access memory (RAM) 703. In the RAM 703, various programs and data needed by the operations of the system 700 are also stored. The CPU 701, the ROM 702 and the RAM 703 are connected with each other via a bus 704. An input/output (I/O) interface 705 is also connected to the bus 704.

The following components are connected to the I/O interface 705: an input portion 706, including a keyboard, a mouse, and the like; an output portion 707, including, for example, a cathode-ray tube (CRT), a liquid crystal display (LCD), a speaker, and the like; a storage portion 708, including a hard disk, and the like; and a communication portion 709, including, for example, an LAN card, a network interface card of a modem, and the like. The communication portion 709 may execute communication processing by means of the Internet, as an example. A driver 710 is also connected to the I/O interface 705 as needed. A delectable medium 711, such as a magnetic disk, an optical disk, a compact disc, a semiconductor memory and the like, is installed on the driver 710 as needed, so that a computer program read therefrom is installed in the storage portion 708 as needed.

In particular, according to the embodiments of the present disclosure, the processes described above with reference to the flowcharts may be implemented as computer software programs. For example, the embodiments of the present disclosure include a computer program product, which includes a computer program carried on a computer-readable medium, and the computer program contains program codes for executing the method illustrated in the flowcharts. In such embodiments, the computer program may be downloaded and installed from a network via the communication portion 709, and/or installed from the delectable medium 711. When the computer program is executed by the central processing unit (CPU) 701, the above functions defined in the system of the present disclosure are executed.

It should be noted that, the computer-readable medium described in the present disclosure may be either a computer-readable signal medium or a computer-readable storage medium, or any combination of the two. The computer-readable storage medium may be, for example, but is not limited to, an electronic, magnetic, optical, electromagnetic, infrared, or semiconductor system, apparatus or device, or a combination of any one of the above. More specific examples of the computer-readable storage medium may include, but are not limited to: an electrical connection having one or more wires, a portable computer magnetic disk, a hard disk, a random access memory (RAM), a read-only memory (ROM), an erasable programmable read-only memory (EPROM or a flash memory), an optical fiber, a portable compact disc-read-only memory (CD-ROM), an optical storage device, a magnetic storage device, or any suitable combination of the above. In the present disclosure, the computer-readable storage medium may be any tangible medium that contains or stores a program, wherein the program may be used by or in conjunction with an instruction execution system, apparatus or device. In the present disclosure, the computer-readable signal medium may include data signals that are propagated in a baseband or as part of a carrier, wherein the data signals carry computer-readable program codes. Such propagated data signals may take many forms, including, but not limited to, electromagnetic signals, optical signals, or any suitable combination thereof. The computer-readable signal medium may also be any computer-readable medium other than the computer-readable storage medium, and the computer-readable signal medium may send, propagate or transport the program for use by or in conjunction with the instruction execution system, apparatus or device. The program codes contained on the computer-readable medium may be transmitted with any suitable medium, including, but not limited to: wireless, an electrical wire, an optical cable, RF, and the like, or any suitable combination thereof.

The flowcharts and block diagrams in the drawings illustrate the system architecture, functions and operations of possible implementations of systems, methods and computer program products according to various embodiments of the present disclosure. In this regard, each block in the flowcharts or block diagrams may represent a part of a module, a program segment, or a code, which contains one or more executable instructions for implementing specified logical functions. It should also be noted that, in some alternative implementations, the functions annotated in the block may occur out of the sequence annotated in the drawings. For example, two blocks shown in succession may, in fact, be executed substantially concurrently, or the blocks may sometimes be executed in a reverse sequence, depending upon the functions involved. It should also be noted that each block in the block diagrams and/or flowcharts, and combinations of the blocks in the block diagrams and/or flowcharts may be implemented by dedicated hardware-based systems for executing specified functions or operations, or combinations of dedicated hardware and computer instructions.

The modules involved in the described embodiments of the present disclosure may be implemented in a software or hardware manner. The described modules may also be disposed in a processor, for example, it may be described as: a processor includes a request parsing module, a password verifying module, a sub-wallet opening module and a token generating module. The names of these modules do not constitute limitations of the modules themselves in a certain case. For example, the request parsing module may also be described as "a module for sending a payment token generation request to a token service provider".

As another aspect, the present disclosure further provides a computer-readable medium, wherein the computer-readable medium may be contained in the device described in the above embodiments; and it may also be present separately and is not assembled into the device. The computer-readable medium carries one or more programs that, when executed by the device, cause the device to perform the following operations:

- parsing a payment token acquisition request of a user, so as to obtain a target digital wallet, a target merchant, and a wallet payment password corresponding to the target digital wallet;
- sending the wallet payment password to an operating system of the target digital wallet, so that the operating system of the target digital wallet verifies the wallet payment password, and receiving a verification result returned by the operating system of the target digital wallet;
- in the case that the verification is passed, sending a sub-wallet opening request to the operating system of the target digital wallet, so that the operating system of the target digital wallet generates a digital currency sub-wallet corresponding to the target digital wallet and the target merchant, and receiving a sub-wallet opening result returned by the operating system of the target digital wallet; and in the case that wallet opening is successful, sending a payment token generation request to a token service provider, so that the token service provider generates a payment token corresponding to the digital currency sub-wallet, and receiving a payment token generation result returned by the token service provider.

According to the technical solutions of the embodiments of the present disclosure, the user may establish payment tokenization at a digital wallet end in advance, thereby facilitating the centralized management of payment tokenization relationships by the user, and thus improving the convenience and security of the user using tokenization payment.

The above specific embodiments do not constitute a limitation on the protection scope of the present disclosure. Those skilled in the art should be aware that various modifications, combinations, sub-combinations and substitutions may occur depending on design requirements and other factors. Any modifications, equivalent substitutions, improvements and the like, made within the spirit and principles of the present disclosure, shall all be included within the protection scope of the present disclosure.

What is claimed is:

1. A payment tokenization method based on a digital currency sub-wallet, comprising:

a digital wallet system parsing a payment token acquisition request of a user, as to obtain a target digital wallet, a target merchant, and a wallet payment password corresponding to the target digital wallet;

the digital wallet system sending the wallet payment password to an operating system of the target digital wallet;

the operating system of the target digital wallet verifying the wallet payment password;

the digital wallet system receiving a verification result returned by the operating system of the target digital wallet;

in a case that the verification result is passed, the digital wallet system sending a sub-wallet opening request to the operating system of the target digital wallet;

the operating system of the target digital wallet generating a digital currency sub-wallet corresponding to the target digital wallet and the target merchant;

the digital wallet system receiving a sub-wallet opening result returned by the operating system of the target digital wallet;

in a case that wallet opening is successful, the digital wallet system sending a payment token generation request to a token service provider;

the token service provider generating a payment token corresponding to the digital currency sub-wallet;

the digital wallet system receiving a payment token generation result returned by the token service provider;

the digital wallet system acquiring a risk control level of the target digital wallet and historical consumption data of the consumption account of the user in the target merchant;

the digital wallet system determining, according to the historical consumption data of the consumption account and the risk control level, a payment limit of the payment token corresponding to the consumption account;

the digital wallet system receiving a collection request sent by a target merchant background system in response to a consumption request of a user, wherein the collection request comprises the payment token and a collection amount of the user, wherein a digital currency sub-wallet of the payment token corresponds to a target merchant;

the digital wallet system determining, according to the payment token, a target operation mechanism background system corresponding to the digital currency sub-wallet;

the digital wallet system sending a collection request message to the target operation mechanism background system;

the digital wallet system receiving digital currency transferred from the target operation mechanism background system in response to the collection request message;

when it is verified that the transferred digital currency is consistent with the collection amount and is less than the payment limit, the digital wallet system pushing payment result information to the target merchant background system; and the target merchant background system pushing payment success information to the user.

2. The payment tokenization method as claimed in claim 1, further comprising:

before receiving the payment token acquisition request of the user, acquiring a merchant list of the user from the token service provider, and sending the merchant list to a terminal for display, so that the user selects one or more merchants from the merchant list as the target merchant; or, before receiving the payment token acquisition request of the user, acquiring a digital wallet list of the user, and sending the digital wallet list to a terminal for display, so that the user selects the target digital wallet from the digital wallet list.

3. The payment tokenization method as claimed in claim 2, further comprising:

after acquiring the digital wallet list of the user and sending the digital wallet list to the terminal for display, in response to an operation of the user for selecting the target digital wallet from the digital wallet list, acquiring a merchant list corresponding to the target digital wallet, and sending the merchant list to the terminal for display, so that the user selects, from the merchant list corresponding to the target digital wallet, one or more merchants as the target merchant.

4. The payment tokenization method as claimed in claim 2, further comprising: after the user selects one or more merchants from the merchant list as the target merchant, acquiring account information of the target merchant, verifying the account information of the target merchant, and confirming that the verification is passed.

5. The payment tokenization method as claimed in claim 4, wherein acquiring the account information of the target merchant comprises:

determining whether there is the account information of the target merchant in a local storage device of the terminal; if so, acquiring the account information of the target merchant from the local storage device; and otherwise, acquiring the account information of the target merchant from a merchant mechanism system of the target merchant, and storing the acquired account information of the target merchant in the local storage device.

6. The payment tokenization method as claimed in claim 4, wherein verifying the account information of the target merchant comprises: verifying whether real name information of the target merchant is consistent with communication information of the target merchant; if so, the verification is passed; and otherwise, the verification is not passed.

7. The payment tokenization method as claimed in claim 6, the method further comprising: sending a request for pushing a payment token to the token service provider, so that the token service provider generates the payment token corresponding to the digital currency sub-wallet, and pushes the payment token to a merchant server system of the target merchant via the operating system of the target digital wallet, the merchant mechanism system of the target merchant;

after the merchant server system of the target merchant receiving the payment token, acquiring a response message from the merchant server system of the target merchant via the merchant mechanism system of the target merchant, the operating system of the target digital wallet and the token service provider; and wherein the merchant server system of the target merchant pushes the payment token to a merchant terminal of the target merchant, so that the merchant terminal of the target merchant displays the message pushed by the merchant server system of the target merchant.

8. The payment tokenization method as claimed in claim 1, further comprising: before sending the sub-wallet opening request to the operating system of the target digital wallet, confirming that there is no digital currency sub-wallet corresponding to the target digital wallet and the target merchant.

9. The payment tokenization method as claimed in claim 8, wherein the payment token acquisition request comprises: a plurality of consumption accounts of the user in the target merchant; and sending the payment token generation request to the token service provider comprises: respectively sending, to the token service provider, a payment token generation request corresponding to each consumption account, so that the token service provider respectively generates a payment token corresponding to each consumption account.

10. The payment tokenization method as claimed in claim 1, further comprising:

after generating the digital currency sub-wallet corresponding to the target digital wallet and the target merchant, in response to a limit query request of the user for a sub-wallet to be queried, acquiring a sub-wallet limit of the sub-wallet to be queried, and sending the sub-wallet limit to a terminal for display; or, after generating the digital currency sub-wallet corresponding to the target digital wallet and the target merchant, receiving a limit modification request of the user, parsing the limit modification request, as to obtain a sub-wallet to be adjusted of which a limit is to be adjusted, and a target limit thereof, and sending the sub-wallet to be adjusted and the target limit thereof to an operating system corresponding to the sub-wallet to be adjusted, so that the operating system corresponding to the sub-wallet to be adjusted adjusts a sub-wallet limit of the sub-wallet to be adjusted to the target limit.

11. The payment tokenization method as claimed in claim 10, further comprising: before receiving the limit modification request of the user, acquiring a current limit of the sub-wallet to be adjusted, generating a sub-wallet limit management page according to the current limit of the sub-wallet to be adjusted, and sending the sub-wallet limit management page to the terminal for display, so that the user sets the target limit of the sub-wallet to be adjusted by means of an operation on the sub-wallet limit management page.

12. The payment tokenization method as claimed in claim 10, further comprising: after generating the digital currency sub-wallet corresponding to the target digital wallet and the target merchant, in response to a payment request of the user based on a target sub-wallet, verifying the payment request to determine that an amount to be paid is less than or equal to a sub-wallet limit of the target sub-wallet.

13. A payment tokenization system based on a digital currency sub-wallet, comprising: a digital wallet system, a token service provider and an operating system, wherein, the digital wallet system parses a payment token acquisition request of a user, so as to obtain a target digital wallet, a target merchant, and a wallet payment password corresponding to the target digital wallet; sends the wallet payment password to an operating system of the target digital wallet, so that the operating system of the target digital wallet verifies the wallet payment password;

in the case that the verification is passed, the digital wallet system sends a sub-wallet opening request to the operating system of the target digital wallet, and the operating system of the target digital wallet generates a digital currency sub-wallet corresponding to the target digital wallet and the target merchant, and returns a sub-wallet opening result to the digital wallet system;

when judging according to the sub-wallet opening result that wallet opening is successful, the digital wallet system sends a payment token generation request to the token service provider;

the token service provider generates a payment token corresponding to the digital currency sub-wallet, and then returns a payment token generation result to the digital wallet system;

the digital wallet system acquires a risk control level of the target digital wallet and historical consumption data of the consumption account of the user in the target merchant; and determines, according to the historical consumption data of the consumption account and the risk control level, a payment limit of the payment token corresponding to the consumption account;

the digital wallet system receives a collection request sent by a target merchant background system in response to a consumption request of a user, wherein the collection request comprises the payment token and a collection amount of the user, wherein a digital currency sub-wallet of the payment token corresponds to a target merchant;

the digital wallet system determines, according to the payment token, a target operation mechanism background system corresponding to the digital currency sub-wallet, and sends a collection request message to the target operation mechanism background system; and the digital wallet system receives digital currency transferred from the target operation mechanism background system in response to the collection request message, and when it is verified that the transferred digital currency is consistent with the collection amount and is less than the payment limit, pushes payment result information to the target merchant background system, and the target merchant background system pushes payment success information to the user.

14. A payment tokenization electronic device based on a digital currency sub-wallet, comprising:

one or more processors; and a storage apparatus, configured to store one or more programs, wherein when the one or more programs are executed by the one or more processors, the one or more processors implement the following actions:

a digital wallet system parsing a payment token acquisition request of a user, as to obtain a target digital wallet, a target merchant, and a wallet payment password corresponding to the target digital wallet;

the digital wallet system sending the wallet payment password to an operating system of the target digital wallet;

the operating system of the target digital wallet verifying the wallet payment password;

the digital wallet system receiving a verification result returned by the operating system of the target digital wallet;

in a case that the verification result is passed, the digital wallet system sending a sub-wallet opening request to the operating system of the target digital wallet;

the operating system of the target digital wallet generating a digital currency sub-wallet corresponding to the target digital wallet and the target merchant;

the digital wallet system receiving a sub-wallet opening result returned by the operating system of the target digital wallet;

in a case that wallet opening is successful, the digital wallet system sending a payment token generation request to a token service provider;

the token service provider generating a payment token corresponding to the digital currency sub-wallet;

the digital wallet system receiving a payment token generation result returned by the token service provider;

the digital wallet system acquiring a risk control level of the target digital wallet and historical consumption data of the consumption account of the user in the target merchant;

the digital wallet system determining, according to the historical consumption data of the consumption account and the risk control level, a payment limit of the payment token corresponding to the consumption account;

the digital wallet system receiving a collection request sent by a target merchant background system in response to a consumption request of a user, wherein the collection request comprises the payment token and a collection amount of the user, wherein a digital currency sub-wallet of the payment token corresponds to a target merchant;

the digital wallet system determining, according to the payment token, a target operation mechanism background system corresponding to the digital currency sub-wallet;

the digital wallet system sending a collection request message to the target operation mechanism background system;

the digital wallet system receiving digital currency transferred from the target operation mechanism background system in response to the collection request message;

when it is verified that the transferred digital currency is consistent with the collection amount and is less than the payment limit, the digital wallet system pushing payment result information to the target merchant background system; and the target merchant background system pushing payment success information to the user.

15. A non-transitory computer-readable medium, on which a computer program is stored, wherein the program, when being executed by a processor, implements the following actions:

a digital wallet system parsing a payment token acquisition request of a user, as to obtain a target digital wallet, a target merchant, and a wallet payment password corresponding to the target digital wallet;

the digital wallet system sending the wallet payment password to an operating system of the target digital wallet;

the operating system of the target digital wallet verifying the wallet payment password;

the digital wallet system receiving a verification result returned by the operating system of the target digital wallet;

in a case that the verification result is passed, the digital wallet system sending a sub-wallet opening request to the operating system of the target digital wallet;

the operating system of the target digital wallet generating a digital currency sub-wallet corresponding to the target digital wallet and the target merchant;

the digital wallet system receiving a sub-wallet opening result returned by the operating system of the target digital wallet;

in a case that wallet opening is successful, the digital wallet system sending a payment token generation request to a token service provider;

the token service provider generating a payment token corresponding to the digital currency sub-wallet;

the digital wallet system receiving a payment token generation result returned by the token service provider;

the digital wallet system acquiring a risk control level of the target digital wallet and historical consumption data of the consumption account of the user in the target merchant;

the digital wallet system determining, according to the historical consumption data of the consumption account and the risk control level, a payment limit of the payment token corresponding to the consumption account;

the digital wallet system receiving a collection request sent by a target merchant background system in response to a consumption request of a user, wherein the collection request comprises the payment token and a collection amount of the user, wherein a digital currency sub-wallet of the payment token corresponds to a target merchant;

the digital wallet system determining, according to the payment token, a target operation mechanism background system corresponding to the digital currency sub-wallet;

the digital wallet system sending a collection request message to the target operation mechanism background system;

the digital wallet system receiving digital currency transferred from the target operation mechanism background system in response to the collection request message;

when it is verified that the transferred digital currency is consistent with the collection amount and is less than the payment limit, the digital wallet system pushing payment result information to the target merchant background system; and the target merchant background system pushing payment success information to the user.

16. The payment tokenization method as claimed in claim 2, further comprising:

after generating the digital currency sub-wallet corresponding to the target digital wallet and the target merchant, in response to a limit query request of the user for a sub-wallet to be queried, acquiring a sub-wallet limit of the sub-wallet to be queried, and sending the sub-wallet limit to a terminal for display; or, after generating the digital currency sub-wallet corresponding to the target digital wallet and the target merchant, receiving a limit modification request of the user, parsing the limit modification request, as to obtain a sub-wallet to be adjusted of which a limit is to be adjusted, and a target limit thereof, and sending the sub-wallet to be adjusted and the target limit thereof to an operating system corresponding to the sub-wallet to be adjusted, so that the operating system corresponding to the sub-wallet to be adjusted adjusts a sub-wallet limit of the sub-wallet to be adjusted to the target limit.

17. The payment tokenization method as claimed in claim 3, further comprising:

after generating the digital currency sub-wallet corresponding to the target digital wallet and the target merchant, in response to a limit query request of the user for a sub-wallet to be queried, acquiring a sub-wallet limit of the sub-wallet to be queried, and sending the sub-wallet limit to a terminal for display; or, after generating the digital currency sub-wallet corresponding to the target digital wallet and the target merchant, receiving a limit modification request of the user, parsing the limit modification request, as to obtain a sub-wallet to be adjusted of which a limit is to be adjusted, and a target limit thereof, and sending the sub-wallet to be adjusted and the target limit thereof to an operating system corresponding to the sub-wallet to be adjusted, so that the operating system corresponding to the sub-wallet to be adjusted adjusts a sub-wallet limit of the sub-wallet to be adjusted to the target limit.

18. The payment tokenization method as claimed in claim 4, further comprising:

after generating the digital currency sub-wallet corresponding to the target digital wallet and the target merchant, in response to a limit query request of the user for a sub-wallet to be queried, acquiring a sub-wallet limit of the sub-wallet to be queried, and sending the sub-wallet limit to a terminal for display; or, after generating the digital currency sub-wallet corresponding to the target digital wallet and the target merchant, receiving a limit modification request of the user, parsing the limit modification request, as to obtain a sub-wallet to be adjusted of which a limit is to be adjusted, and a target limit thereof, and sending the sub-wallet to be adjusted and the target limit thereof to an operating system corresponding to the sub-wallet to be adjusted, so that the operating system corresponding to the sub-wallet to be adjusted adjusts a sub-wallet limit of the sub-wallet to be adjusted to the target limit.

* * * * *